United States Patent
Hikabe

(10) Patent No.: US 8,611,341 B2
(45) Date of Patent: Dec. 17, 2013

(54) LOWER MAIN DEVICE AND NON-IP TERMINAL HOUSING METHOD

(75) Inventor: Akinori Hikabe, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/818,870

(22) PCT Filed: Mar. 11, 2011

(86) PCT No.: PCT/JP2011/055796
§ 371 (c)(1),
(2), (4) Date: Feb. 25, 2013

(87) PCT Pub. No.: WO2012/053234
PCT Pub. Date: Apr. 26, 2012

(65) Prior Publication Data
US 2013/0156046 A1    Jun. 20, 2013

(30) Foreign Application Priority Data
Oct. 20, 2010 (JP) ................................. 2010-235518

(51) Int. Cl.
*H04L 12/66*    (2006.01)
(52) U.S. Cl.
USPC .......................................... 370/353; 370/352
(58) Field of Classification Search
None
See application file for complete search history.

(56) References Cited

U.S. PATENT DOCUMENTS

| | | | |
|---|---|---|---|
| 6,839,341 B1* | 1/2005 | Nakajima | 370/352 |
| 2003/0072301 A1 | 4/2003 | Ko | |
| 2003/0072330 A1 | 4/2003 | Yang et al. | |
| 2010/0067520 A1 | 3/2010 | Goto | |
| 2011/0182286 A1* | 7/2011 | Zhang et al. | 370/352 |

FOREIGN PATENT DOCUMENTS

| | | |
|---|---|---|
| JP | 2000-358098 A | 12/2000 |
| JP | 2006-054666 A | 2/2006 |
| JP | 2006-261978 A | 9/2006 |
| JP | 2007-013600 A | 1/2007 |
| JP | 2007-336022 A | 12/2007 |
| JP | 2009-273059 A | 11/2009 |
| JP | 2009273059 * | 11/2009 |
| JP | 2010-103652 A | 5/2010 |
| JP | 2010-124456 A | 6/2010 |

OTHER PUBLICATIONS

EP Search Report issued Oct. 9, 2013 in corresponding EP Patent Application No. 11834079.3.

* cited by examiner

*Primary Examiner* — Jae Y Lee
(74) *Attorney, Agent, or Firm* — Sughrue Mion, PLLC

(57) ABSTRACT

The objective of the present invention is to provide a lower main device capable of connecting a non-IP terminal such as a digital terminal to an upper main device using an IP network and of accommodating call control. The lower main device behaves as one or more IP terminals toward the upper main device and houses one or more non-IP terminals which each correspond to the one or more IP terminals.

4 Claims, 5 Drawing Sheets

LOWER MAIN DEVICE AND NON-IP TERMINAL HOUSING METHOD

CROSS REFERENCE TO RELATED APPLICATIONS

This application is a National Stage of International Application No. PCT/JP2011/055796 filed Mar. 11, 2011, claiming priority based on Japanese Patent Application No. 2010-235518, filed Oct. 20, 2010, the contents of all of which are incorporated herein by reference in their entirety.

TECHNICAL FIELD

The present invention relates to a lower main device and a non-IP (Internet Protocol) terminal housing method to connect to an upper main device and a non-IP terminal.

BACKGROUND ART

Conventionally, to connect a phone to a main device from a place of the main device to a geographically distant place, it is necessary to install a necessary number of IP terminals 903-1, 902-2, ... and 902-n as illustrated in FIG. 1 and connect each of IP terminals 903-1, 902-2, ... and 902-n to an upper main device through an IP network.

Further, although there was a technique of connecting a digital terminal to an upper main device through a digital network other than the IP network, there is no technique of connecting the digital terminal to the upper main device through the IP network.

PTL 1 discloses connecting a terminal housing device to a communication device connected to an IP network and a line switching network through a digital subscriber line and connecting a terminal device to the terminal housing device.
{PTL 1} JP-A-2010-124456

SUMMARY OF INVENTION

Technical Problem

However, IP terminals are more costly than non-IP terminals (for example, digital terminals), and require a switching hub to dispose the terminals and therefore are very costly. Further, each IP terminal needs to be set and managed, and has a significant problem in terms of maintenance and construction.

Furthermore, when connection between an IP terminal and the upper main device is cut due to failure in the IP network, there is also a problem that this IP terminal cannot be connected to a phone connected to other IP terminals and a public line.

Meanwhile, a technique of connecting a digital terminal to an upper device through a digital line other than an IP network cannot connect the digital terminal to the upper main device through the IP network.

Although, according to the technique disclosed in PTL 1, a communication device includes an IP converting unit and the IP converting unit includes a VoIP processing unit and a packet processing unit, the communication device does not include a call control function of a phone.

It is therefore an object of the present invention to provide a lower main device and a non-IP terminal housing method which can connect non-IP terminals such as digital terminals to an upper main device through an IP network and support call control.

Solution to Problem

The present invention provides a lower main device that behaves as one or more IP terminals with respect to an upper main device, and that houses one or more non-IP terminals corresponding to the one or more IP terminals.

Further, the present invention provides a non-IP terminal housing method of behaving as one or more IP terminals with respect to an upper main device, and housing one or more non-IP terminals corresponding to the one or more IP terminals.

Furthermore, the present invention provides a program that causes a computer to execute the non-IP terminal housing method of behaving as one or more IP terminals with respect to an upper main device, and housing one or more non-IP terminals corresponding to the one or more IP terminals.

Advantageous Effects of the Invention

According to the present invention, each non-IP terminal can behave as an IP terminal with respect to an upper main device.

DESCRIPTION OF EMBODIMENTS

Hereinafter, an embodiment for implementing the present invention will be described in detail with reference to the drawings.

Figure 2:
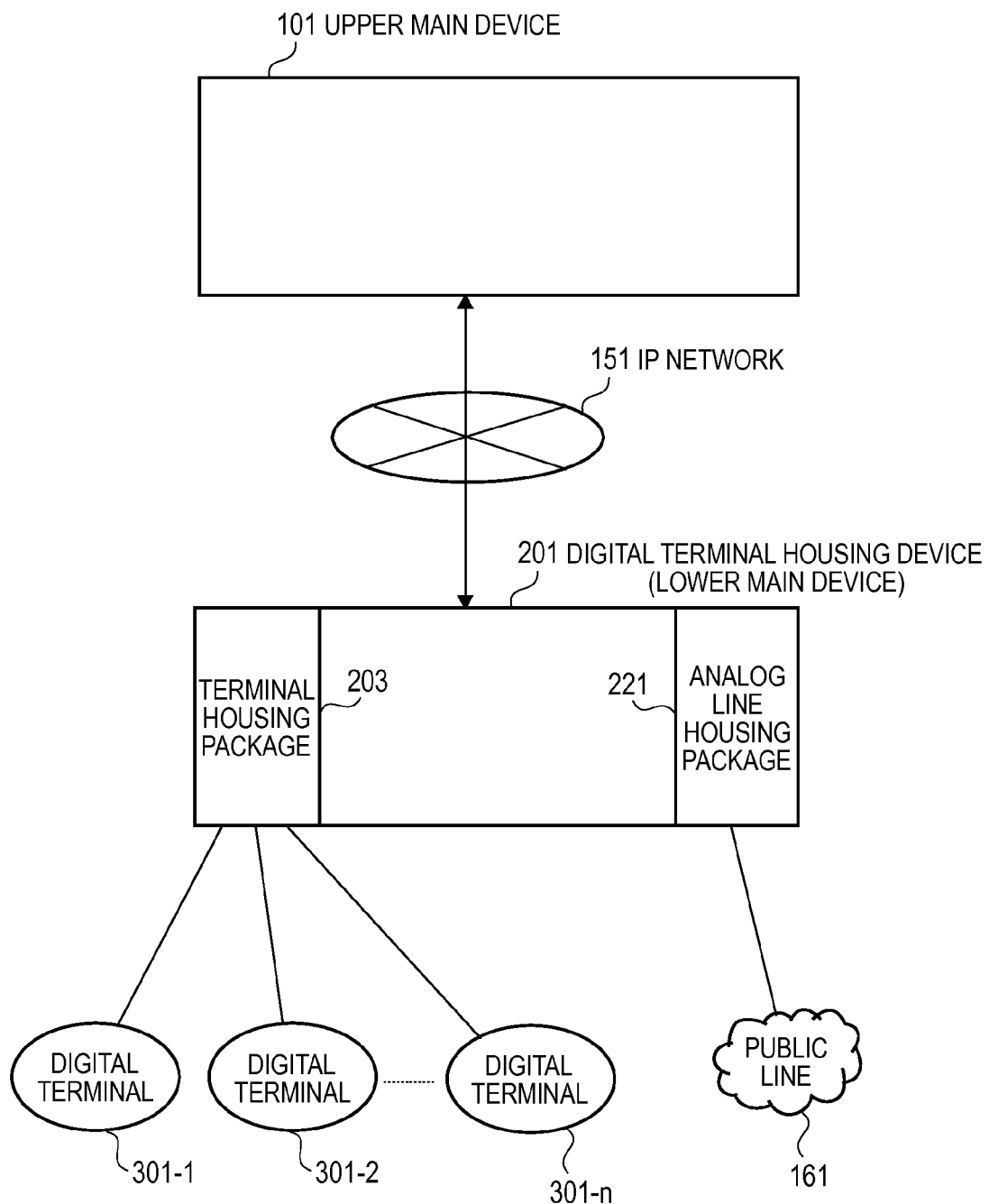
FIG. 2 A figure is a first conceptual diagram of an embodiment of the present invention.

As illustrated in FIG. 2, a configuration is employed with the present embodiment where a plurality of digital terminals 301-1, 301-2, ... and 301-n are housed in one digital terminal housing device (lower main device) 201 using a terminal housing package 203, and the plurality of digital terminals 301-1, 301-2, ... and 301-n are collectively connected to an upper main device 101 through the lower main device 201 and through an IP network.

That is, instead of connecting each IP terminal to the upper main device, one lower main device 201 collectively houses and manages the plurality of digital terminals 301-1, 301-2, ... and 301-n.

The lower main device 201 collectively performs communication between the upper main device and all digital terminals to be connected to the lower main device 201.

By this means, only one lower main device 201 needs to be connected with the upper main device 101 through an IP network 151.

By so doing, IP terminals which require a great amount of cost can be replaced with low-cost digital terminals, so that the lower main device 201 can collectively manage the plurality of digital terminals 301-1, 301-2, ... and 301-n and substantially reduce management labor required per terminal.

Further, the lower main device 201 which is originally operating as the main device is used, so that, upon failure in the IP network 151, the lower main device 201 can stop communication with the upper main device and operate as an independent main device. Consequently, the plurality of digital terminals 301-1, 301-2, . . . and 301-n can be connected to a public line 161 through the terminal housing package 203 and an analog housing package 221 of the lower main device 201.

Figure 1:
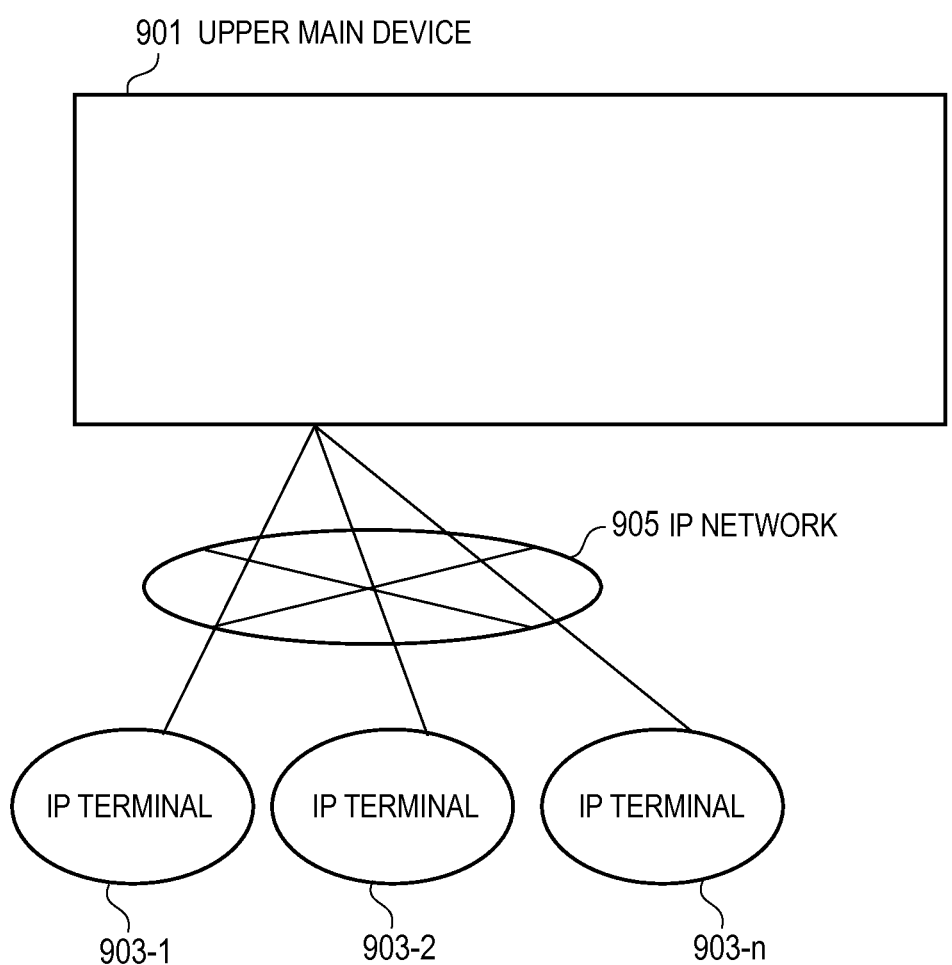
FIG. 1 A figure is a conceptual diagram illustrating a normal configuration.
Figure 3:
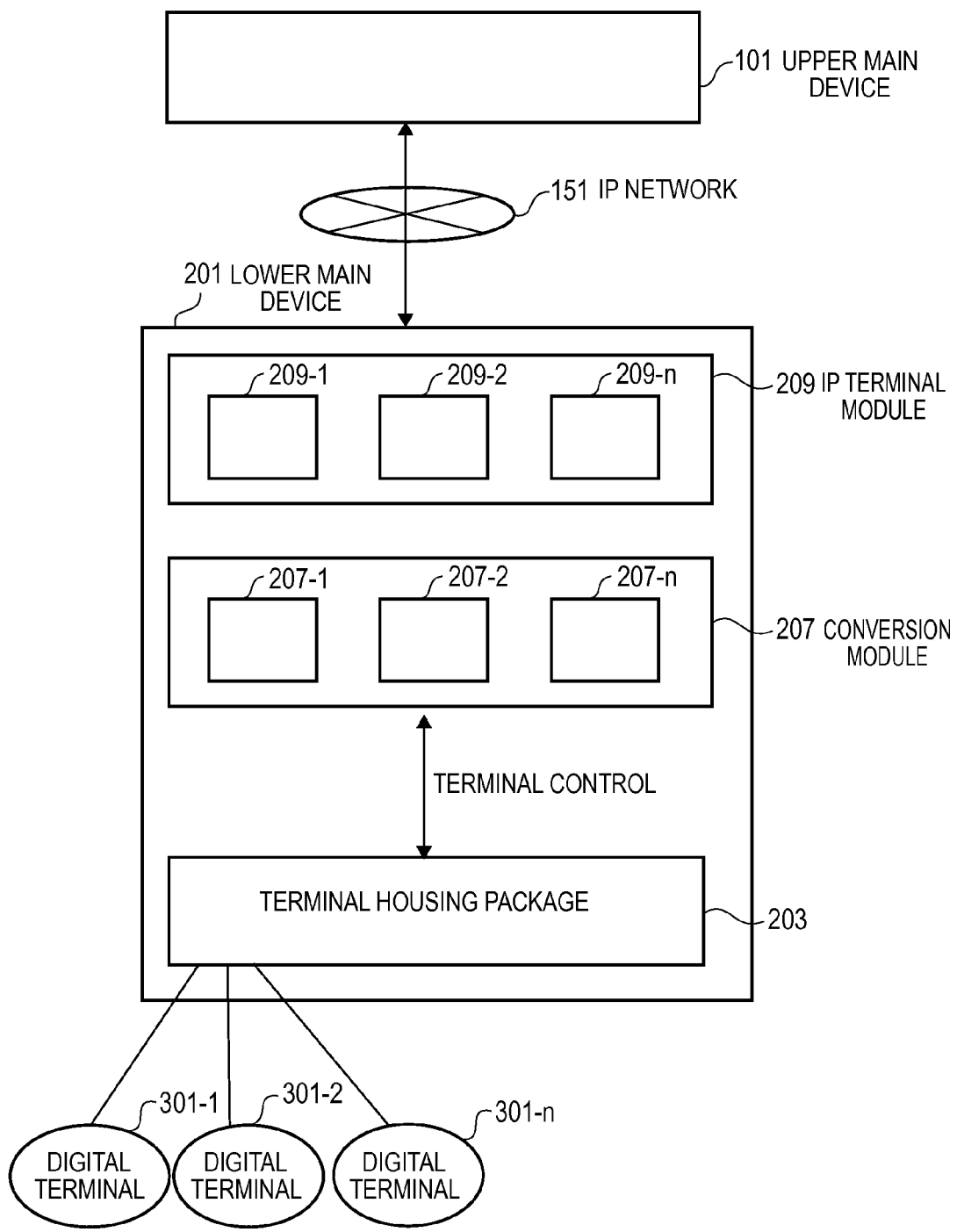
FIG. 3 A figure is a second conceptual diagram of the embodiment of the present invention.

In the present embodiment, by incorporating an existing mechanism of connecting IP terminals in the lower main device 201, the target function is easily realized, and an interface between the upper main device 101 and the lower main device 201 is multiplexed with an interface between an upper device 901 and an IP terminal 903 illustrated in FIG. 1. As illustrated in FIG. 3, the lower main device 201 is virtually implemented inside an IP terminal module 209 (including submodules 209-1, 209-2, . . . and 209-n per IP terminal), and each of the submodules 209-1, 209-2, . . . and 209-n of the IP terminal module 209 transmits/receives messages with the upper main device.

That is, when the digital terminal 301-i (i is a value of one of 1, 2, . . . and n) connects to the terminal housing package 203 of the lower main device 201, the IP terminal 209 notifies a message to the upper main device 101 as if the IP terminal were connected, and performs resist processing of SIP (Session Initiation Protocol). By so doing, the upper main device 101 can recognize that the digital terminal 301-i is connected to the lower main device 201 in the same way how the IP terminal is connected, and perform control in the same way how the IP terminal is controlled.

That is, when the digital terminal 301-i is off-hooked, if the IP terminal module 209 notifies a message to the upper main device 101 in the same way as the way when the IP terminal is off-hooked and the upper main device 101 transmits a message (including a message for a display instruction (such as an LCD or LED instruction)) to the lower main device 201 in the same way as the way for the IP terminal, a terminal instruction data conversion module 207b of the lower main device 201 converts the message into a message for the digital terminal 301-i and outputs the message to the terminal housing package 203.

By so doing, the upper main device 101 can perform control in the same way as how the IP terminal is connected without particularly concerning that the subordinate digital terminal 301-i of the lower main device 201 is connected.

Further, the lower main device 201 can also easily control the digital terminal 301-i by utilizing a control module implemented in the IP terminal as the IP terminal module 209.

These processing are independently performed for digital terminals to be connected using the submodules 209-1, 209-2, . . . and 209-i inside the IP terminal module 209 and submodules 207-1, 207-2, . . . and 207-n inside the conversion module 207.

Figure 5:
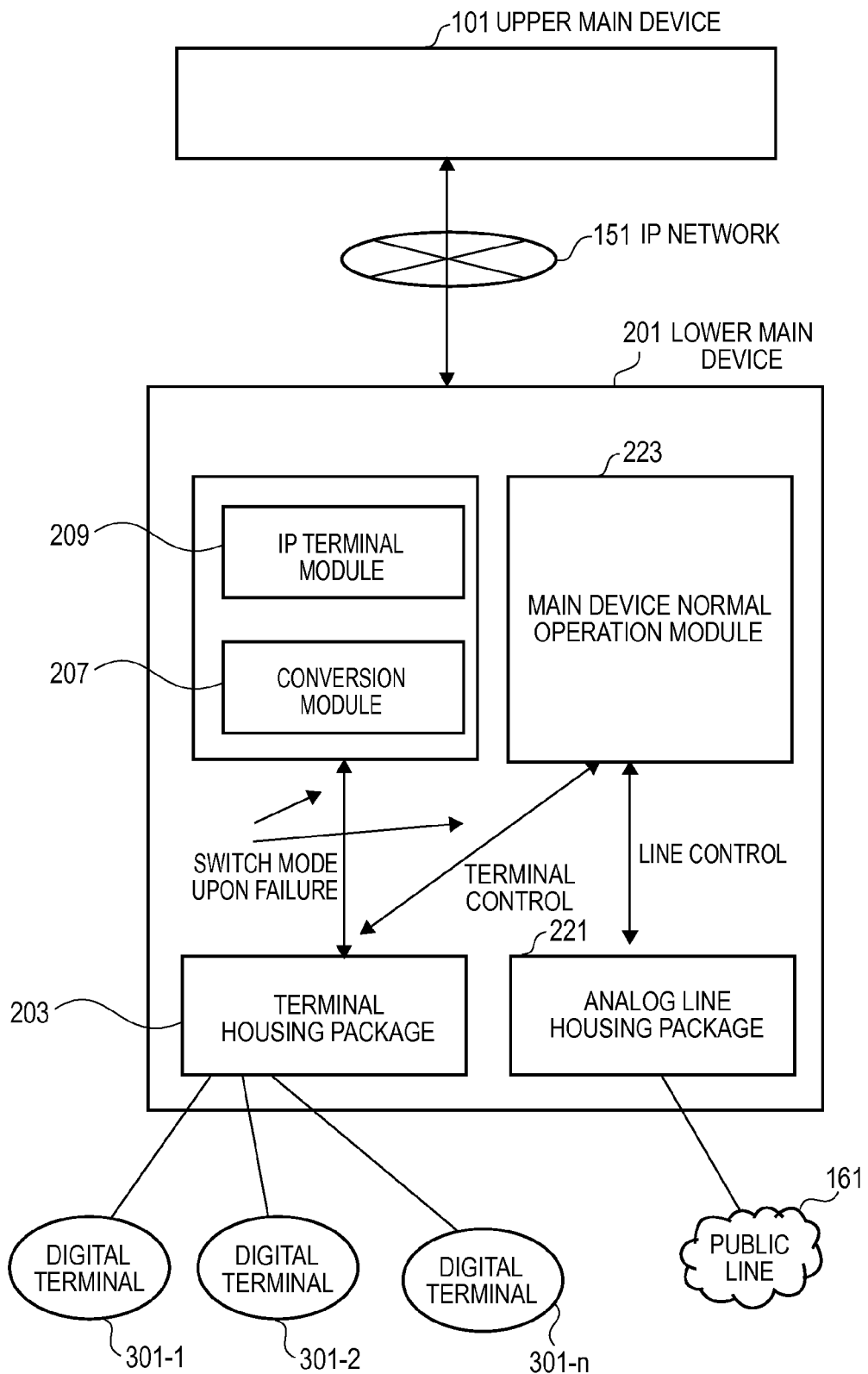
FIG. 5 A figure is a block diagram for explaining a function when a failure occurs in an IP network in the embodiment of the present invention.

As illustrated in FIG. 5, although it is possible to establish connection with the upper main device 101 and perform the operation by performing the above control upon a normal operation, when a failure occurs in the IP network 151, it is possible to switch an operation mode and transition to the original operation of the main device using a main device normal operation module 223 and an analog line housing package 221.

According to a configuration example in FIG. 3, the upper main device 101 and the lower main device 201 are connected through the IP network 151. The lower main device 201 houses the digital terminals 301-1, 301-2, . . . and 301-n through the terminal housing package 203.

A conceptual diagram illustrated in FIG. 3 will be additionally described focusing on a flow of a message.

Figure 4:
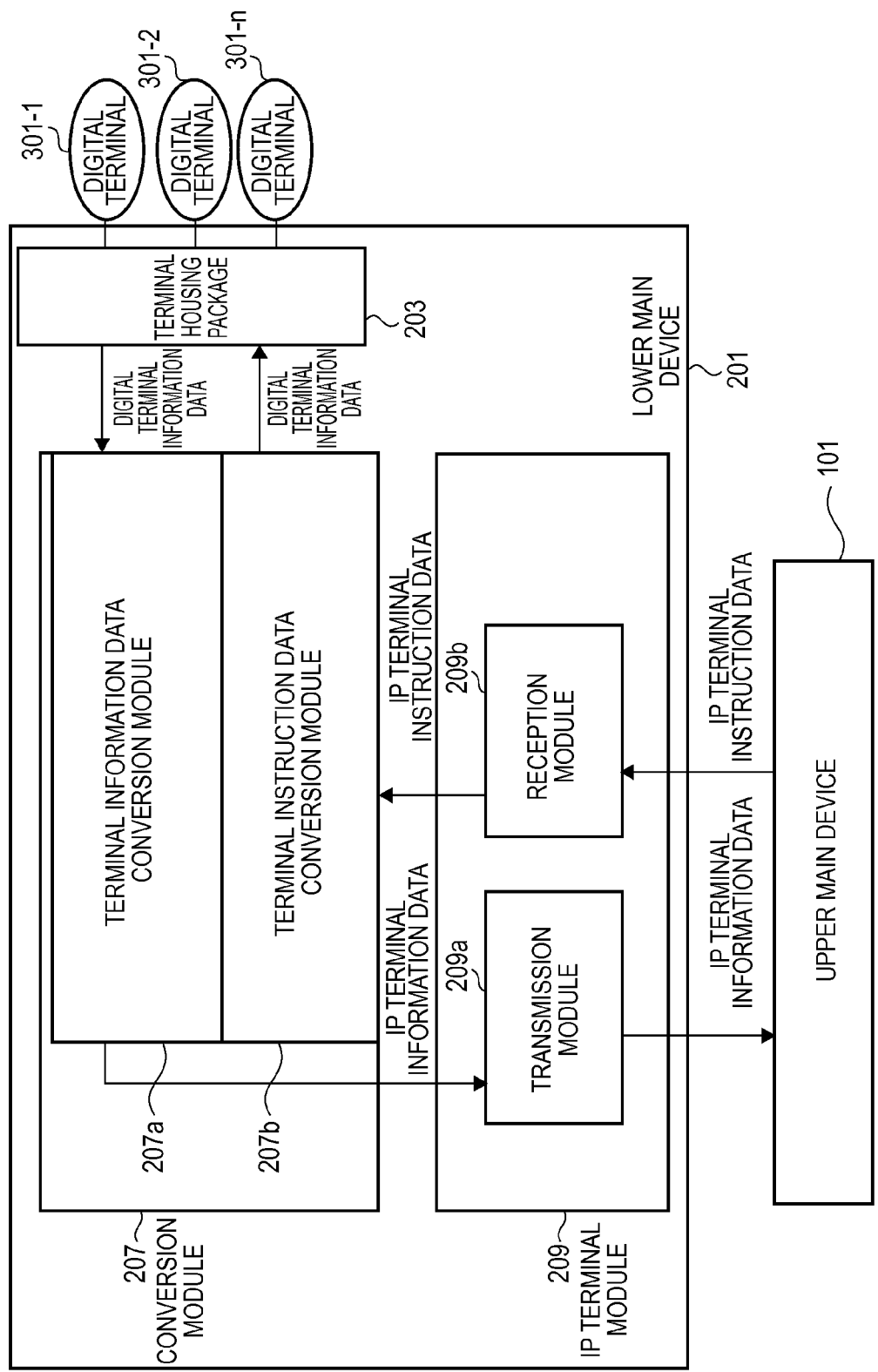
FIG. 4 A figure is a block diagram illustrating an internal configuration of a lower main device according to the embodiment of the present invention.

Referring to FIG. 4, the digital terminal instruction data refers to data for giving an instruction of the lower main device 201 to the digital terminals 301-1, 301-2, . . . and 301-n to change the LCD, the LED and the like. The digital terminal information data refers to data for notifying from the digital terminals 301-1, 301-2, . . . and 301-n to the lower main device 201 that a button is pushed or terminal information indicating off-hook and the like.

The IP terminal instruction data and the IP terminal information data refer to terminal instruction data and terminal information data in the IP terminal control module 209, respectively.

The conversion module 207 converts the IP terminal instruction data into digital terminal instruction data for a digital terminal. Further, the conversion module 207 converts the digital terminal information data for the digital terminal into IP terminal information data. The IP terminal module 209 plays a role of establishing connection with the upper main device 101, and transmitting/receiving the IP terminal instruction data and the IP terminal information data to and from the upper main device 101.

When the digital terminal 301-i is off-hooked, the digital terminal information data is transmitted from the terminal housing package 203 to the terminal information data conversion module 207a, and the terminal information data conversion module 207a converts the digital terminal information data into IP terminal information data and passes the IP terminal information data to the IP terminal module 209.

The transmission module 209a in the IP terminal module 209 multiplexes the IP terminal information data of each digital terminal inputted from the terminal information data conversion module 207a, and transmits the IP terminal information data to the upper main device 101.

When receiving the IP terminal information data, the upper main device 101 recognizes that the digital terminal 301-i is off-hooked, and transmits the IP terminal instruction data to the IP terminal module 209 to change content of the LCD or the LED.

The reception module 209b of the IP terminal module 209 receives the IP terminal instruction data, demultiplexes the IP terminal instruction data to IP terminal instruction data of each digital terminal and outputs the IP terminal instruction data of each digital terminal to the conversion module 207.

The terminal instruction data conversion module 207b in the conversion module 207 converts the IP terminal instruction data matching the digital terminal 301-i into digital terminal instruction data for the digital terminal 301-i, and outputs the digital terminal instruction data to the terminal housing package 203.

Under the above control, when the digital terminal 301-i is off-hooked, the LCD or the LED of the digital terminal 301-i can be changed according to the instruction of the upper main device 101.

As to the other operations, a basic control flow is the same as the above, and the digital terminal 301-i can be operated under this control. By repeating the same control as the above a plurality of times, the digital terminal 301-i can be connected to the upper main device 101.

If, during this repetition, the digital terminal transmits digital terminal information data indicating that a call operation to the digital terminal is performed, to the terminal information data conversion module 207a through the terminal housing package 203, the terminal information data conversion module 207a converts this digital terminal information data into IP terminal information representing an INVITE message of SIP, and outputs this IP terminal information data.

When the terminal instruction data conversion module 207b receives the IP terminal instruction data representing 180 ringing of SIP from the upper main device 101 through the reception module 209b, the terminal instruction data conversion module 207b converts this IP terminal information data into digital terminal instruction data for displaying ringing on the LCD or the LED, and outputs this digital terminal instruction data to the digital terminal through the terminal housing package 203. When the terminal instruction data conversion module 207b receives the IP terminal instruction data representing 200 OK ringing of SIP of a communicating party from the upper main device 101 through the reception module 209b, the terminal instruction data conversion module 207b converts this IP terminal information data into digital terminal instruction data for notifying the off-hook of the communicating party to the LCD or the LED and outputs the digital terminal instruction data to the digital terminal through the terminal housing package 203. When the digital terminal transmits a response signal corresponding to digital terminal instruction data as digital terminal information data to the terminal information data conversion module 207a through the terminal housing package 203, the terminal information data conversion module 207a converts this digital terminal information data into IP terminal information data representing an ACK message of SIP, and outputs this IP terminal information data.

The upper main device 101 controls terminals based on IP terminal instruction data and IP terminal information data and, consequently, basically does not need to care that a terminal is a digital terminal connected through the lower main device 201.

Next, an operation upon occurrence of failure will be described.

Referring to FIG. 5, under a normal operation, data from the terminal housing package 203 is transmitted to the conversion module 207, and is transmitted to the upper main device through the IP terminal module 209 as described above. Although the lower main device 201 monitors a state of connection with the upper main device 101 through the IP network 151 at all times and processes data in this connected state if the connected state is normal, when an abnormal connected state continues for a certain period of time, data from the terminal housing package 203 is processed by a main device function of the main device normal operation module 223 of the lower main device 201, and a mode is switched to an abnormality mode for allowing the lower main device 201 to control the digital terminal 301-i.

The abnormality mode refers to a mode in which the lower main device 201 originally functions as the main device, under the abnormality mode, the housed analog line housing package 221 can also connect the digital terminal 301-i to, for example, a phone connected to the public line 161. By this means, even when the lower main device 201 and the upper main device 101 are disconnected, the digital terminal 301-i can use the public line 161 and it is possible to avoid a situation in which the digital terminal 301-i cannot perform communication.

Although an example has been described with the above embodiment where digital terminals are used instead of IP terminals, the embodiment can be modified such that analog terminals are used instead of IP terminals. Further, the above embodiment can also be modified to support a line control.

The lower main device according to the above embodiment can be realized by hardware, software or a combination thereof. The software can be realized by causing a computer to read and execute a program.

According to the embodiment, by effectively utilizing the existing mechanism of controlling IP terminals and regarding the lower main device as a plurality of so-called IP terminals, the lower main device can be realized through efficient IP connection.

Further, by comparing with the upper main device, using the lower main device with a system of small capacity, it is possible to significantly reduce entire cost compared to a system in which a plurality of terminals are connected to the upper main device.

In addition, by making an access to the lower main device through the IP network using a configuration tool, it is possible to collectively set a resist destination of a digital terminal to be connected to the lower main device and significantly improve constructionability and maintainability.

Further, even when the lower main device and the upper main device cannot be connected, the digital terminal connected to the lower main device can use the public line and it is possible to improve survivability.

Although a part or entirety of the above embodiment can be disclosed as the following supplemental notes, the part or entirety of the above embodiment is not limited to the following supplemental notes.

(Supplemental Note 1)

A lower main device behaves as one or more IP terminals with respect to an upper main device, and houses one or more non-IP terminals corresponding to the one or more IP terminals.

(Supplemental Note 2)

The lower main device described in supplemental note 1, has:

a terminal housing package that houses the one or more non-IP terminals;

a terminal information data conversion module that receives an input of non-IP terminal information data outputted by each non-IP terminal through the terminal housing package, and that converts the non-IP terminal information data into IP terminal information data related to each non-IP terminal;

a transmission module that multiplexes the IP terminal information data outputted by the terminal information data conversion module and related to each non-IP terminal, and that transmits the IP terminal information data to the upper main device through an IP network;

a reception module that demultiplexes IP terminal instruction data received from the upper main device through the IP network, and that outputs the IP terminal instruction data related to each non-IP terminal; and a terminal instruction data conversion module that receives an input of the IP terminal instruction data outputted by the reception module and related to each non-IP terminal, converts the IP terminal instruction data into non-IP terminal instruction data related to each non-IP terminal and outputs the non-IP terminal instruction data related to each non-IP terminal to the terminal housing package, wherein the terminal housing package outputs to each non-IP terminal the non-IP terminal instruction data inputted from the terminal instruction data conversion module and related to each non-IP terminal.

(Supplemental Note 3)

The lower main device described in supplemental note 1 or 2, further has a main device functioning unit, and, when a state of communication with the upper main device becomes abnormal, the main device functioning unit functions in place of the upper main device.

(Supplemental Note 4)

A non-IP terminal housing method includes behaving as one or more IP terminals with respect to an upper main device, and housing one or more non-IP terminals corresponding to the one or more IP terminals.

(Supplemental Note 5)

The non-IP terminal housing method described in supplemental note 4 includes:

a step of, at a terminal information data conversion module, inputting non-IP terminal information data outputted by each non-IP terminal through the terminal housing package, and converting the non-IP terminal information data into IP terminal information data related to each non-IP terminal;

a step of, at a transmission module, multiplexing the IP terminal information data outputted by the terminal information data conversion module and related to each non-IP terminal, and transmitting the IP terminal information data to the upper main device through an IP network;

a step of, at a reception module, demultiplexing IP terminal instruction data received from the upper main device through the IP network, and outputting the IP terminal instruction data related to each non-IP terminal; and a step of, at a terminal instruction data conversion module, inputting the IP terminal instruction data outputted by the reception module and related to each non-IP terminal, converting the IP terminal instruction data into non-IP terminal instruction data related to each non-IP terminal and outputting the non-IP terminal instruction data related to each non-IP terminal through the terminal housing package (Supplemental Note 6)

The non-IP terminal housing method described in supplemental note 4 or 5, further includes a step of, when a state of communication with the upper main device becomes abnormal, at the main device functioning unit, functioning in place of the upper main device.

(Supplemental Note 7)

A program causes a computer to execute a non-IP terminal housing method of behaving as one or more IP terminals with respect to an upper main device, and housing one or more non-IP terminals corresponding to the one or more IP terminals.

(Supplemental Note 8)

In the program described in supplemental note 7, the non-IP terminal housing method includes:

a step of, at a terminal information data conversion module, inputting non-IP terminal information data outputted by each non-IP terminal through the terminal housing package, and converting the non-IP terminal information data into IP terminal information data related to each non-IP terminal;

a step of, at a transmission module, multiplexing the IP terminal information data outputted by the terminal information data conversion module and related to each non-IP terminal, and transmitting the IP terminal information data to the upper main device through an IP network;

a step of, at a reception module, demultiplexing IP terminal instruction data received from the upper main device through the IP network, and outputting the IP terminal instruction data related to each non-IP terminal; and a step of, at a terminal instruction data conversion module, inputting the IP terminal instruction data outputted by the reception module and related to each non-IP terminal, converting the IP terminal instruction data into non-IP terminal instruction data related to each non-IP terminal and outputting the non-IP terminal instruction data related to each non-IP terminal through the terminal housing package (Supplemental Note 9)

In the program described in supplemental note 7 or 8, the non-IP terminal housing method further includes a step of, when a state of communication with the upper main device becomes abnormal, at the main device functioning unit, functioning in place of the upper main device.

The program can be stored using various types of non-transitory computer readable media and supplied to the computer. The various types of non-transitory computer readable media include various types of tangible storage media. The various types of non-transitory computer readable media include, for example, a magnetic recording medium (for example, a flexible disk, a magnetic tape and a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM and a RAM (random access memory)). Further, the program may be supplied to the computer using various types of transitory computer readable media. The transitory computer readable media include, for example, an electric signal, an optical signal and an electromagnetic wave. The transitory computer readable media can allow a program to be supplied to the computer through a wired communication channel such as electric wires or optical wires or wireless communication channels.

This application is based on Japanese Patent Application No. 2010-235518 (filed on Oct. 20, 2010), and claims priority under the Paris Convention based on Japanese Patent Application No. 2010-235518. The disclosed contents of Japanese Patent Application No. 2010-235518 are incorporated in this description by reference to Japanese Patent Application No. 2010-235518.

Although the typical embodiment of the present invention has been described in detail, it should be understood that various changes, substitutions and alternatives can be made without deviating from the spirit and the scope of the invention defined by the claims. Further, even if the claims are amended upon application procedure, the inventors intend that a uniform scope of the claimed invention is maintained.

INDUSTRIAL APPLICABILITY

The present invention can be utilized to connect a plurality of non-IP terminals to a main device.

REFERENCE SINGS LIST

101 UPPER MAIN DEVICE
151 IP NETWORK
201 DIGITAL TERMINAL HOUSING DEVICE (LOWER MAIN DEVICE)
203 TERMINAL HOUSING PACKAGE
207 CONVERSION MODULE
207a TERMINAL INFORMATION DATA CONVERSION MODULE
207b TERMINAL INSTRUCTION DATA CONVERSION MODULE
209 IP TERMINAL MODULE
209a TRANSMISSION MODULE
209b RECEPTION MODULE
221 ANALOG LINE HOUSING PACKAGE
223 MAIN DEVICE NORMAL OPERATION MODULE
301-1 TO 301-$n$ DIGITAL TERMINAL

The invention claimed is:

1. A lower main device that behaves as one or more IP terminals with respect to an upper main device, and that houses one or more non-IP terminals corresponding to the one or more IP terminals, the lower main device comprising:

a terminal housing package that houses the one or more non-IP terminals;

a terminal information data conversion module that receives an input of non-IP terminal information data outputted by each non-IP terminal through the terminal housing package, and that converts the non-IP terminal information data into IP terminal information data related to each non-IP terminal;

a transmission module that multiplexes the IP terminal information data outputted by the terminal information data conversion module and related to each non-IP terminal, and that transmits the IP terminal information data to the upper main device through an IP network; a reception module that demultiplexes IP terminal instruction data received from the upper main device through the IP network, and that outputs the IP terminal instruction data related to each non-IP terminal; and a terminal instruction data conversion module that receives an input of the IP terminal instruction data outputted by the reception module and related to each non-IP terminal, converts the IP terminal instruction data into non-IP terminal instruction data related to each non-IP terminal and outputs the non-IP terminal instruction data related to each non-IP terminal to the terminal housing package, wherein the terminal housing package outputs to each non-IP terminal the non-IP terminal instruction data inputted from the terminal instruction data conversion module and related to each non-IP terminal, wherein:

an IP terminal module comprising the transmission terminal and the reception module is configured by utilizing a control module implemented in the IP terminal, and comprises one or more submodules each of which corresponds to one of the non-IP terminals;

a conversion module comprising the terminal information data conversion module and the terminal instruction data conversion module comprises one or more submodules each of which corresponds to one of the non-IP terminals; and each submodule included in the IP terminal module functions as an IP terminal for the upper main device in place of each of the non-IP terminals corresponding to the each submodule, by processes carried out by each submodule that is included in the IP terminal module and operates independently of other submodules included in the IP terminal module, and by each submodule that is included in the conversion module and operates independently of other submodules included in the conversion module.

2. The lower main device according to claim 1, further comprising a main device functioning unit, wherein, when a state of communication with the upper main device becomes abnormal, the main device functioning unit functions in place of the upper main device.

3. A non-IP terminal housing method of behaving as one or more IP terminals with respect to an upper main device, and housing one or more non-IP terminals corresponding to the one or more IP terminals, the non-IP terminal housing method comprising:

a step of, at a terminal housing package, housing the one or more non-IP terminals;

a step of, at a terminal information data conversion module, inputting non-IP terminal information data outputted by each non-IP terminal through the terminal housing package, and converting the non-IP terminal information data into IP terminal information data related to each non-IP terminal;

a step of, at a transmission module, multiplexing the IP terminal information data outputted by the terminal information data conversion module and related to each non-IP terminal, and transmitting the IP terminal information data to the upper main device through an IP network;

a step of, at a reception module, demultiplexing IP terminal instruction data received from the upper main device through the IP network, and outputting the IP terminal instruction data related to each non-IP terminal; and a step of, at a terminal instruction data conversion module, inputting the IP terminal instruction data outputted by the reception module and related to each non-IP terminal, converting the IP terminal instruction data into non-IP terminal instruction data related to each non-IP terminal and outputting to each non-IP terminal the non-IP terminal instruction data related to each non-IP terminal through the terminal housing package, wherein:

an IP terminal module comprising the transmission terminal and the reception module is configured by utilizing a control module implemented in the IP terminal, and comprises one or more submodules each of which corresponds to one of the non-IP terminals;

a conversion module comprising the terminal information data conversion module and the terminal instruction data conversion module comprises one or more submodules each of which corresponds to one of the non-IP terminals; and each submodule included in the IP terminal module functions as an IP terminal for the upper main device in place of each of the non-IP terminals corresponding to the each submodule, by processes carried out by each submodule that is included in the IP terminal module and operates independently of other submodules included in the IP terminal module, and by each submodule that is included in the conversion module and operates independently of other submodules included in the conversion module.

4. A non-transitory computer readable medium storing a program causing a computer to execute a non-IP terminal housing method of behaving as one or more IP terminals with respect to an upper main device, and housing one or more non-IP terminals corresponding to the one or more IP terminals, the non-IP terminal housing method comprising:

a step of, at a terminal housing package, housing the one or more non-IP terminals;

a step of, at a terminal information data conversion module, inputting non-IP terminal information data outputted by each non-IP terminal through the terminal housing package, and converting the non-IP terminal information data into IP terminal information data related to each non-IP terminal;

a step of, at a transmission module, multiplexing the IP terminal information data outputted by the terminal information data conversion module and related to each non-IP terminal, and transmitting the IP terminal information data to the upper main device through an IP network;

a step of, at a reception module, demultiplexing IP terminal instruction data received from the upper main device through the IP network, and outputting the IP terminal instruction data related to each non-IP terminal; and a step of, at a terminal instruction data conversion module, inputting the IP terminal instruction data outputted by the reception module and related to each non-IP terminal, converting the IP terminal instruction data into non-IP terminal instruction data related to each non-IP terminal and outputting to each non-IP terminal the non-IP terminal instruction data related to each non-IP terminal through the terminal housing package, wherein:

an IP terminal module comprising the transmission terminal and the reception module is configured by utilizing a control module implemented in the IP terminal, and comprises one or more submodules each of which corresponds to one of the non-IP terminals;

a conversion module comprising the terminal information data conversion module and the terminal instruction data conversion module comprises one or more submodules each of which corresponds to one of the non-IP terminals; and each submodule included in the IP terminal module functions as an IP terminal for the upper main device in place of each of the non-IP terminals corresponding to the each submodule, by processes carried out by each submodule that is included in the IP terminal module and operates independently of other submodules included in the IP terminal module, and by each submodule that is included in the conversion module and operates independently of other submodules included in the conversion module.

* * * * *